US012665498B2

(12) United States Patent
Mino

(10) Patent No.: US 12,665,498 B2
(45) Date of Patent: Jun. 23, 2026

(54) POWER CONVERSION DEVICE

(71) Applicant: Murata Manufacturing Co., Ltd.,
Nagaokakyo (JP)

(72) Inventor: Kazuaki Mino, Nagaokakyo (JP)

(73) Assignee: **MURATA MANUFACTURING CO.,
LTD.**, Kyoto (JP)

( * ) Notice: Subject to any disclaimer, the term of this
patent is extended or adjusted under 35
U.S.C. 154(b) by 598 days.

(21) Appl. No.: 18/219,123

(22) Filed: Jul. 7, 2023

(65) Prior Publication Data

US 2023/0353045 A1 Nov. 2, 2023

Related U.S. Application Data

(63) Continuation of application No.
PCT/JP2021/013447, filed on Mar. 30, 2021.

(30) Foreign Application Priority Data

Feb. 1, 2021 (JP) ................................. 2021-014116

(51) Int. Cl.
H02M 1/42 (2007.01)
B60L 53/16 (2019.01)
(Continued)

(52) U.S. Cl.
CPC ........... H02M 1/4225 (2013.01); B60L 53/16
(2019.02); B60L 53/18 (2019.02); B60L 53/22
(2019.02);
(Continued)

(58) Field of Classification Search
CPC ............. H02M 1/4225; H02M 1/0054; H02M
1/0058; H02M 1/14; H02M 3/1584;
(Continued)

(56) References Cited

U.S. PATENT DOCUMENTS 11,677,313 B2 * 6/2023 Li ........................... H02M 1/14
320/137
2016/0241132 A1 8/2016 Lin et al.
(Continued)

FOREIGN PATENT DOCUMENTS

CN 208955898 U * 6/2019
JP 08205560 A 8/1996
(Continued)

OTHER PUBLICATIONS

International Search Report in PCT/JP2021/013447, mailed Jun. 15,
2021, 3 pages.
(Continued)

*Primary Examiner* — Sonji N Johnson
(74) *Attorney, Agent, or Firm* — Keating & Bennett, LLP

(57) ABSTRACT

When a secondary battery is charged, a switch is closed, and
a first boost chopper circuit, a second boost chopper circuit,
and a totem-pole bridgeless power factor correction circuit,
which are coupled in parallel to each other, are driven to
operate in an interleaving manner, and in this state, an
alternating-current voltage inputted from an AC input ter-
minal is converted into a direct current, and the direct
current is outputted from a direct current output terminal.
When alternating current is outputted using an AC output
terminal, the switch is closed, and the totem-pole bridgeless
PFC circuit is used, and in this state, a DC voltage from the
secondary battery is converted into an alternating current,
and the alternating current is outputted from the AC output
terminal.

20 Claims, 12 Drawing Sheets

(51) Int. Cl.
B60L 53/18 (2019.01)
B60L 53/22 (2019.01)
H02J 7/06 (2006.01)

(52) U.S. Cl.
CPC .............. *H02J 7/06* (2013.01); *B60L 2210/14* (2013.01); *B60L 2210/30* (2013.01); *H02J 2207/20* (2020.01)

(58) Field of Classification Search
CPC ...... H02M 3/1586; B60L 53/16; B60L 53/18; B60L 53/22; B60L 2210/14; B60L 2210/30; B60L 53/14; B60L 2210/40; B60L 1/006; H02J 7/06; H02J 2207/20; H02J 7/02; Y02T 10/70; Y02T 10/7072; Y02T 90/14
See application file for complete search history.

(56) References Cited

U.S. PATENT DOCUMENTS

| | | | |
|---|---|---|---|
| 2016/0285358 A1 | 9/2016 | Ohtake et al. | |
| 2021/0050772 A1* | 2/2021 | Kang | H02M 1/4208 |
| 2021/0320586 A1* | 10/2021 | Thomsen | H03L 7/091 |

FOREIGN PATENT DOCUMENTS

| | | | |
|---|---|---|---|
| JP | 2012090423 A | 5/2012 |
| JP | 2012206379 A | 10/2012 |
| JP | 2016074516 A | 5/2016 |
| JP | 2016187241 A | 10/2016 |
| JP | 2016533147 A | 10/2016 |

OTHER PUBLICATIONS

Written Opinion in PCT/JP2021/013447, mailed Jun. 15, 2021, 3 pages.

* cited by examiner

POWER CONVERSION DEVICE

CROSS REFERENCE TO RELATED APPLICATIONS

This application claims the benefit of priority to Japanese Patent Application No. 2021-014116 filed on Feb. 1, 2021 and is a Continuation Application of PCT Application No. PCT/JP2021/013447 filed on Mar. 30, 2021. The entire contents of each application are hereby incorporated herein by reference.

BACKGROUND OF THE INVENTION

1. Field of the Invention

The present invention relates to a power conversion device to perform conversion between alternating-current (AC) power and direct-current (DC) power.

2. Description of the Related Art

Electric vehicles (EV) or plug-in hybrid electric vehicles (PHEV) have come into wide use in recent years, and EVs or PHEVs use charging methods using AC chargers installed in, for example, home garages. Because an AC voltage is applied to charging plugs of the chargers, PFC converters are provided in the vehicle bodies of EVs or PHEVs.

It is also known that EVs or PHEVs have high-capacity secondary batteries in the vehicle bodies; with the use of the batteries as power sources, AC voltage is outputted from AC outlets via DC-AC inverters, so that users can use general electronic devices in the vehicles.

Japanese Unexamined Patent Application Publication No. 2012-90423 describes a multiphase PFC converter including a rectifier circuit implemented by a diode bridge and multiple boost chopper circuits.

Japanese Unexamined Patent Application Publication No. 2016-533147 describes multiple totem-pole bridgeless power factor correction (PFC) converters.

SUMMARY OF THE INVENTION

The PFC converter described in Japanese Unexamined Patent Application Publication No. 2012-90423 can be implemented with low costs. However, because rectification is provided using a diode bridge, electric power cannot be transmitted bidirectionally. As a result, to provide an AC outlet in the vehicle, an additional DC-AC inverter is also needed.

The totem-pole bridgeless PFC converter described in Japanese Unexamined Patent Application Publication No. 2016-533147 is capable of bidirectionally transmitting electric power. Thus, no additional DC-AC inverter is necessary to provide an AC outlet. As a result of not using a diode, the power conversion efficiency is relatively high. However, this configuration needs many switching elements. When expensive switching elements made of, for example, SiC or GaN are used, the costs increase significantly.

Preferred embodiments of the present invention provide power conversion devices to charge electric vehicles having a high-capacity secondary battery such as an EV or PHEV, with high efficiency in charging to the secondary battery from an electric power system, which is the primary purpose, with no use of an additional DC-AC inverter to provide an AC outlet, as well as with low costs.

A power conversion device according to a preferred embodiment of the present invention includes an alternating-current (AC) voltage input terminal, a first power factor correction (PFC) converter and a second PFC converter that are coupled to the AC voltage input terminal and that are coupled in parallel to each other, and a direct-current (DC) voltage output terminal to supply a combined output obtained by combining an output from the first PFC converter and an output from the second PFC converter. The first PFC converter includes a PFC converter with a diode rectifier. The second PFC converter includes a totem-pole bridgeless PFC converter. The power conversion device further includes a switch coupled to a second PFC-side connection line connecting the AC voltage input terminal and the second PFC converter and an AC voltage output terminal coupled to the second PFC-side connection line. The power conversion device is operable to, based on an operating control of the first PFC converter and the second PFC converter and an on-off control of the switch, selectively operate in any one state selected from a first state in which an AC voltage from the AC voltage input terminal is converted into a DC voltage, and the DC voltage is outputted from the DC voltage output terminal, a second state in which a DC voltage from the DC voltage output terminal is converted into an AC voltage, and the AC voltage is outputted from the AC voltage output terminal, and a direct coupling output state in which an AC voltage from the AC voltage input terminal is outputted from the AC voltage output terminal, in a combined state of the first state and the second state, or in a combined state of the first state and the direct coupling output state.

This configuration includes the first PFC converter, which is an irreversible converter, and the second PFC converter, which is a reversible converter, in a parallel manner. As such, bidirectional electric power supply of alternating current and direct current is achieved. Moreover, the first PFC converter can be configured with lower costs than the second PFC converter. When the first PFC converter is configured with lower costs, loss performance is still unlikely to degrade.

Preferred embodiments of the present invention enable bidirectional power supply of alternating current and direct current with low loss and low costs.

The above and other elements, features, steps, characteristics and advantages of the present invention will become more apparent from the following detailed description of the preferred embodiments with reference to the attached drawings.

DETAILED DESCRIPTION OF THE
PREFERRED EMBODIMENTS

First Preferred Embodiment

A power conversion device according to a first preferred embodiment of the present invention will be described with reference to the drawings.
Example of Application System FIG. 1 illustrates an example of an application system with a power conversion device according to a preferred embodiment of the present invention.

Figure 1:
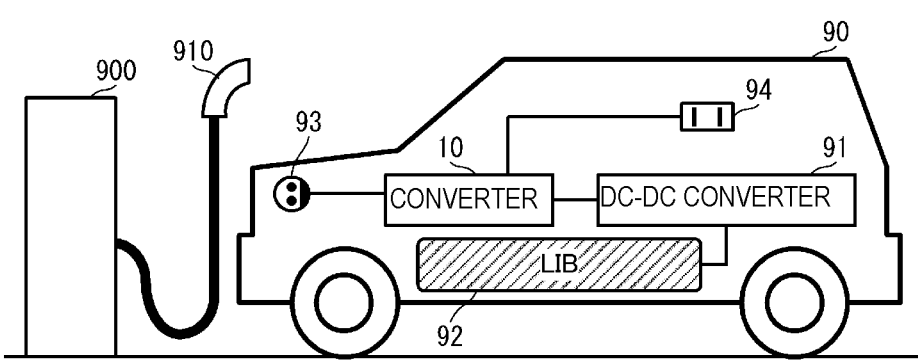
FIG. 1 illustrates an example of an application system with a power conversion device according to a preferred embodiment of the present invention.

As illustrated in FIG. 1, for example, a converter 10 according to the f first preferred embodiment of the present invention is used with an electric vehicle 90. The converter 10 of the present preferred embodiment is not necessarily used with an electric vehicle and may be used with a plug-in hybrid vehicle. The electric vehicle 90 includes the converter 10, a direct current to direct current (DC-DC) converter 91, a secondary battery 92, an alternating-current (AC) charging socket 93, and an AC outlet 94. The converter 10 corresponds to "a power conversion device" according to a preferred embodiment of the present invention. The secondary battery 92 corresponds to "a DC load".

The AC charging socket 93 is coupled to the converter 10. The converter 10 is coupled to the DC-DC converter 91 and the AC outlet 94. The DC-DC converter 91 is coupled to the secondary battery 92.

Basically, in this system, an external charging cable 910 is plugged into the AC charging socket 93 to charge the secondary battery 92. The charging cable 910 is coupled to an external charger 900. As a result, the charger 900 supplies an AC voltage to the AC charging socket 93 through the charging cable 910.

The converter 10 functions as a bidirectional power factor correction (PFC) circuit. The converter 10 converts an AC voltage from the AC charging socket 93 into a DC voltage and outputs the DC voltage to the DC-DC converter 91. The DC-DC converter 91 converts the output voltage from the converter 10 into a charging voltage for the secondary battery 92 and outputs the charging voltage to the secondary battery 92. The secondary battery 92 is charged with this charging voltage.

Additionally, in this system, to output an AC voltage from the AC outlet 94, the secondary battery 92 supplies a DC voltage.

The converter 10, which functions as a bidirectional PFC circuit as described above, converts the DC voltage from the secondary battery 92 to an AC voltage and outputs the AC voltage through the AC outlet 94 to an alternating-current load (for example, an electrical appliance) that is coupled to the AC outlet 94.
Configuration of Converter 10

Figure 2:
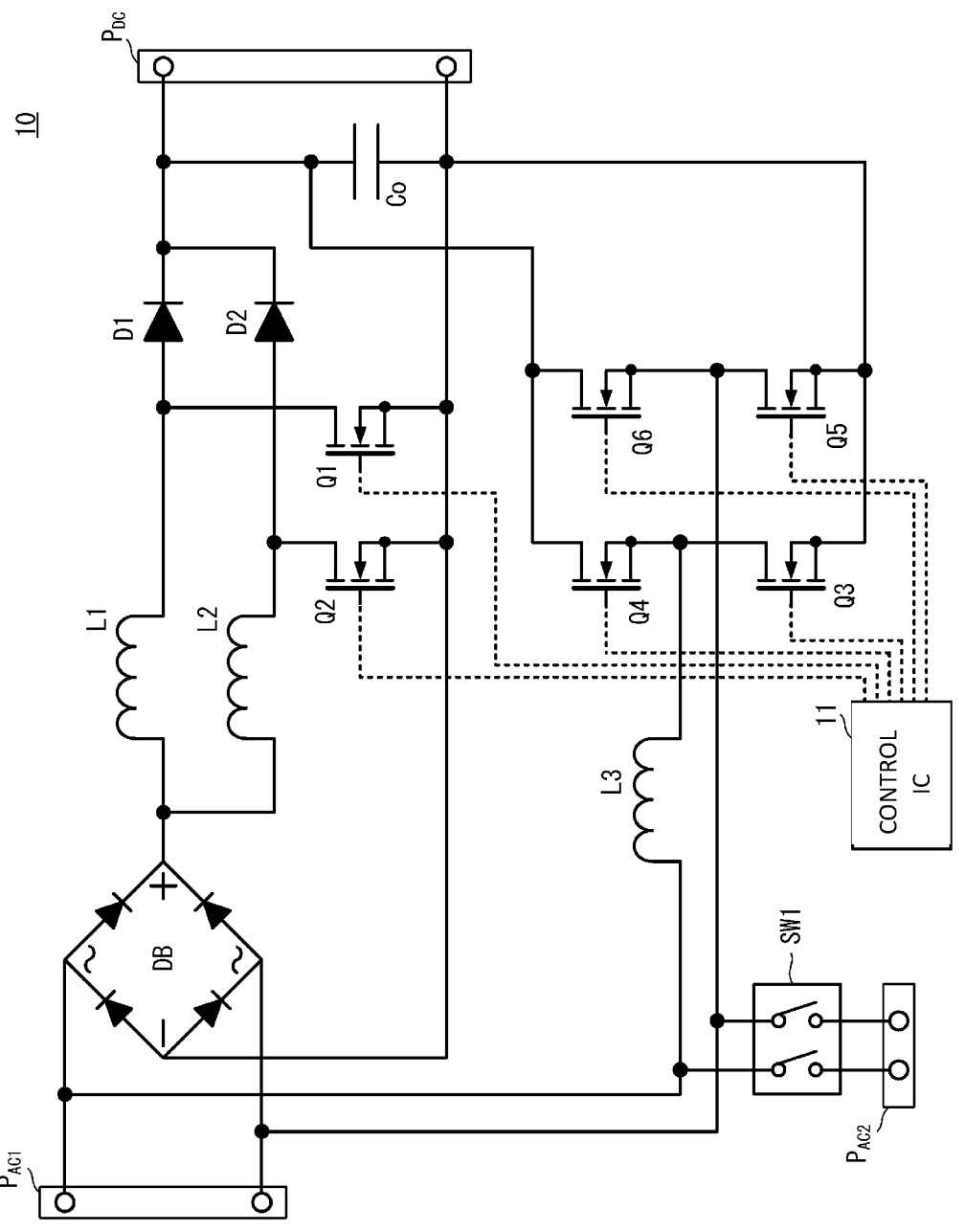
FIG. 2 is an equivalent circuit diagram of the converter (the power conversion device) according to the first preferred embodiment of the present invention.

FIG. 2 is an equivalent circuit diagram of the converter (a power conversion device) according to the first preferred embodiment of the present invention. The converter 10 includes a diode bridge DB, an inductor L1, an inductor L2, an inductor L3, a switching element Q1, a switching element Q2, a switching element Q3, a switching element Q4, a switching element Q5, a switching element Q6, a diode D1, a diode D2, a capacitor Co, a switch SW1, and a control integrated circuit (IC) 11. The converter 10 also includes an AC input terminal $P_{AC1}$, a DC output terminal $P_{DC}$, and an AC output terminal $P_{AC2}$.

The switching element Q1, the switching element Q2, the switching element Q5, and the switching element Q6 are Si metal-oxide-semiconductor field-effect transistors (Si-MOSFETs) of a silicon semiconductor. The switching element Q3 and the switching element Q4 are GaN field-effect transistors (GaN-FETs) of a gallium nitride semiconductor.

AC input terminals of the diode bridge DB are coupled to the AC input terminal $P_{AC1}$. A Hi output terminal of the diode bridge DB is coupled to one end of the inductor L1 and one end of the inductor L2.

A Low output terminal of the diode bridge DB is coupled to a reference potential line. The reference potential line is coupled to a reference potential side of the DC output terminal $P_{DC}$.

The other end of the inductor L1 is coupled to the anode of the diode D1. The other end of the inductor L1 is also coupled to the drain of the switching element Q1. The source of the switching element Q1 is coupled to the reference potential line. The cathode of the diode D1 is coupled to the Hi potential side of the DC output terminal $P_{DC}$. The inductor L1, the switching element Q1, and the diode D1 define a first boost chopper circuit.

The other end of the inductor L2 is coupled to the anode of the diode D2. The other end of the inductor L2 is also coupled to the drain of the switching element Q2. The source of the switching element Q2 is coupled to the reference potential line. The cathode of the diode D2 is coupled to the Hi potential side of the DC output terminal $P_{DC}$. The inductor L2, the switching element Q2, and the diode D2 define a second boost chopper circuit.

The first boost chopper circuit and the second boost chopper circuit correspond to "a first PFC converter".

One end of the inductor L3 is coupled to one terminal of the AC input terminal $P_{AC1}$. The other end of the inductor L3 is coupled to a node of the drain of the switching element Q3 and the source of the switching element Q4. The source of the switching element Q3 is coupled to the reference potential line. The drain of the switching element Q4 is coupled to the Hi potential side of the DC output terminal $P_{DC}$.

A node of the drain of the switching element Q5 and the source of the switching element Q6 is coupled to one terminal of the AC input terminal $P_{AC1}$. The source of the switching element Q5 is coupled to the reference potential line. The drain of the switching element Q6 is coupled to the Hi potential side of the DC output terminal $P_{DC}$. The inductor L3, the switching element Q3, the switching element Q4, the switching element Q5, and the switching element Q6 form a totem-pole bridgeless PFC circuit. This totem-pole bridgeless PFC circuit corresponds to "a second PFC converter".

These configurations enable parallel operations of one phase implemented by the diode bridge DB and the first boost chopper circuit, one phase implemented by the diode bridge DB and the second boost chopper circuit, and one phase implemented by the totem-pole bridgeless PFC circuit. In other words, the diode bridge DB and the boost chopper circuits implement two phases, and the totem-pole bridgeless PFC circuit implements one phase.

The capacitor Co is coupled between the Hi potential side of the DC output terminal $P_{DC}$ and the reference potential side of the DC output terminal $P_{DC}$.

The control IC 11 is coupled to the gates of the multiple (for example, six in the present preferred embodiment) switching elements Q1 to Q6. The control IC 11 outputs switching control signals to the switching elements Q1 to Q6. In other words, drive controls are provided to drive the switching elements Q1 to Q6 based on the switching control signals from the control IC 11.

The switch SW1 is coupled between the AC output terminal $P_{AC2}$ and second PFC-side connection lines connecting the AC input terminal $P_{AC1}$ and the totem-pole bridgeless PFC circuit. The switch SW1 controls connection and disconnection between the second PFC-side connection lines and the AC output terminal $P_{AC2}$.

Charging Secondary Battery 92 (First State)

Figure 3:
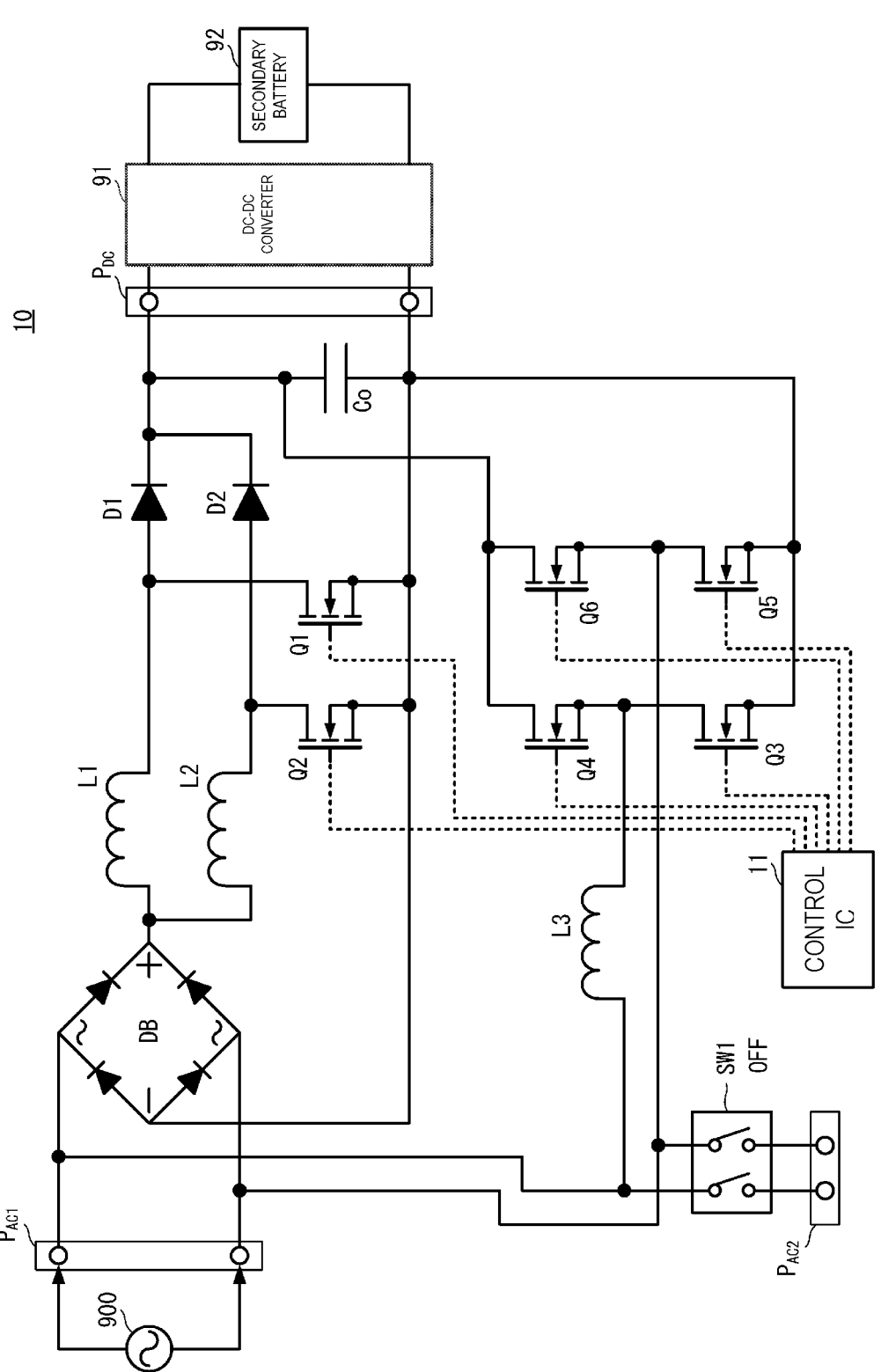
FIG. 3 is an equivalent circuit diagram illustrating a connection state of the converter when a secondary battery is charged.

FIG. 3 is an equivalent circuit diagram illustrating a connection state of the converter when the secondary battery is charged. As illustrated in FIG. 3, the secondary battery 92 is coupled to the DC output terminal $P_{DC}$. Additionally, the charger 900 is coupled to the AC input terminal $P_{AC1}$.

When the secondary battery 92 is charged, an OFF control is provided to turn off the switch SW1. In other words, the switch SW1 is opened. In the present preferred embodiment, when the secondary battery 92 is charged, an OFF control is provided to turn off the switch SW1. However, an ON control may be provided to turn on the switch SW1 (the switch SW1 may be closed). In this case, while the secondary battery 92 is charged, AC voltage can be outputted from the AC output terminal $P_{AC2}$.

In this state, the control IC 11 outputs switching control signals to the switching elements Q1 to Q6. More specifically, the control IC 11 outputs switching control signals to the switching elements Q1 to Q6 to cause the first boost chopper circuit, the second boost chopper circuit, and the totem-pole bridgeless PFC circuit to operate in an interleaving manner.

Figures 4A, 4B, 4C, 4D, 4E, 4F, 4G:
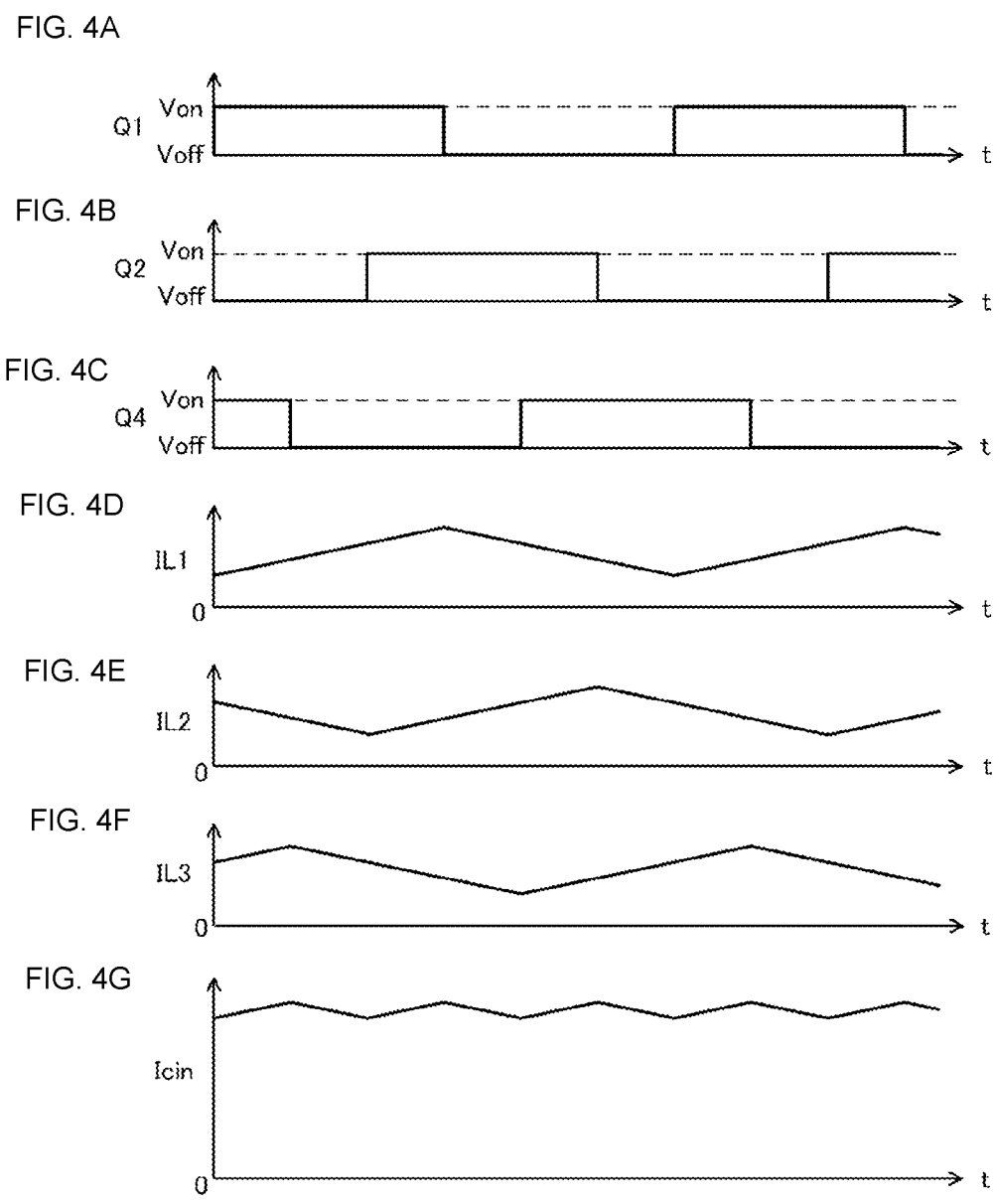
FIGS. 4A to 4G illustrate different waveforms during charging.

FIGS. 4A to 4G illustrate different waveforms during charging. FIGS. 4A to 4C respectively illustrate an example of waveforms of switching control signals for the switching elements Q1, Q2, and Q4. FIGS. 4D to 4F respectively illustrate an example of a waveform of an inductor current at the inductors L1, L2, and L3. FIG. 4G illustrates an example of a waveform of a current at the AC input terminal $P_{AC1}$. No waveform is illustrated for the switching element Q3, the switching element Q5, and the switching element Q6 in the drawing. The waveform at the switching element Q5 is the same as the waveform at the switching element Q4, whereas the waveform at the switching element Q3 and the waveform at the switching element Q6 are opposite in phase to the waveform at the switching element Q4.

When the secondary battery 92 is charged, as illustrated in FIGS. 4A to 4C, ON controls are provided with a phase difference of 120° to turn on the switching element Q1, the switching element Q2, and the switching element Q4. As a result, as illustrated in FIGS. 4D to 4F, an inductor current IL1 at the inductor L1 of the first boost chopper circuit, an inductor current IL2 at the inductor L2 of the second boost chopper circuit, and an inductor current IL3 at the inductor L3 of the totem-pole bridgeless PFC circuit exhibit waveforms that vary with a phase difference of 120°. The ripple currents superimposed on the respective direct-current components are also 120° out of phase.

A current Icin at the AC input terminal $P_{AC1}$ is a current obtained by adding the inductor current IL1, the inductor current IL2, and the inductor current IL3. Because the inductor current IL1, the inductor current IL2, and the inductor current IL3 successively vary with a phase difference of 120° as described above, the corresponding ripple currents act to cancel each other out. As a result, as illustrated in FIG. 4G, the amplitude of the ripple currents in the current Icin of the AC input terminal $P_{AC1}$ is suppressed.

With these controls, the converter 10 converts an AC voltage inputted from the AC input terminal $P_{AC1}$ into a DC voltage and outputs the DC voltage from the DC output terminal $P_{DC}$. The secondary battery 92 is charged with this outputted DC voltage. At this time, by performing the controls described above, harmonic currents and noises produced in the converter 10 are reduced.

Supplying DC Power Stored in Secondary Battery 92 to Outside from AC Output Terminal $P_{AC2}$ (Second State)

Figure 5:
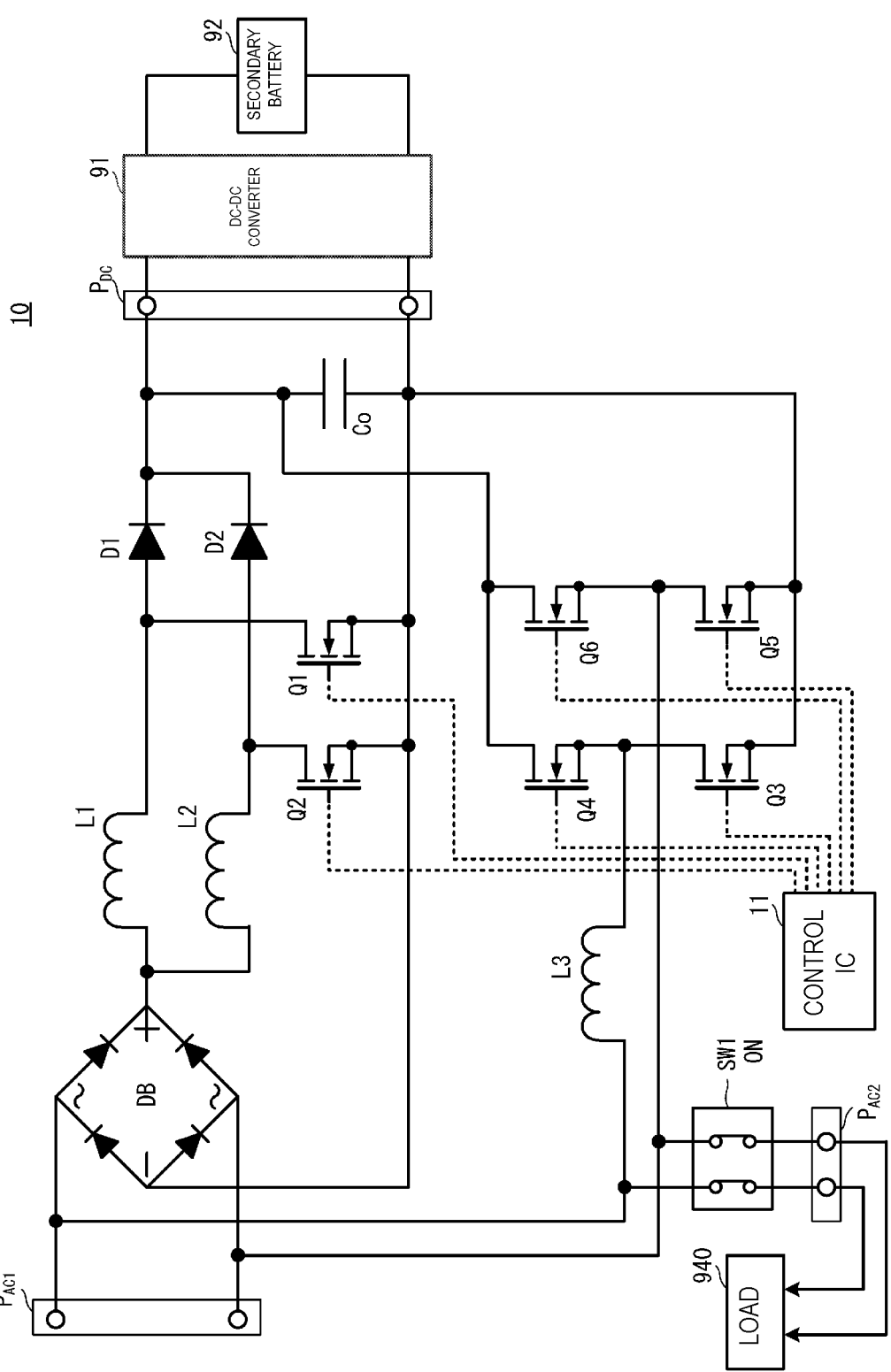
FIG. 5 is an equivalent circuit diagram illustrating a connection state of the converter when the direct-current (DC) power stored in the secondary battery is supplied to the outside from an alternating-current (AC) output terminal.

FIG. 5 is an equivalent circuit diagram illustrating a connection state of the converter when the DC power stored in the secondary battery is supplied to the outside from the AC output terminal. As illustrated in FIG. 5, the secondary battery 92 is coupled to the DC output terminal $P_{DC}$. Additionally, a load 940 is coupled to the AC output terminal $P_{AC2}$. The load 940 is an alternating-current load.

When the DC power stored in the secondary battery 92 is supplied to the outside from the AC output terminal $P_{AC2}$, an ON control is provided to turn on the switch SW1. In other words, the switch SW1 is closed.

Because the first boost chopper circuit and the second boost chopper circuit are both unidirectional PFC converters, it is impossible to convert a DC voltage inputted from the DC output terminal $P_{DC}$ into an alternating current and output the alternating current toward the AC input terminal $P_{AC1}$. Stop controls are hence provided to stop the first boost chopper circuit and the second boost chopper circuit.

Because the totem-pole bridgeless PFC circuit is able to bidirectionally transmit electric power, it is possible to convert a DC voltage inputted from the DC output terminal $P_{DC}$ to an alternating current and output the alternating current toward the AC input terminal $P_{AC1}$ and the AC output terminal $P_{AC2}$. A drive control is hence provided to drive the totem-pole bridgeless PFC circuit.

With these controls, the converter 10 converts a DC voltage inputted from the DC output terminal $P_{DC}$ into an AC voltage and outputs the AC voltage from the AC output terminal $P_{AC2}$. The outputted AC voltage is supplied to the load 940.

At this time, it is desirable that the switching elements of the totem-pole bridgeless PFC circuit be driven at a switching frequency higher than when the secondary battery 92 is charged.

Figures 6A, 6B, 6C, 6D:
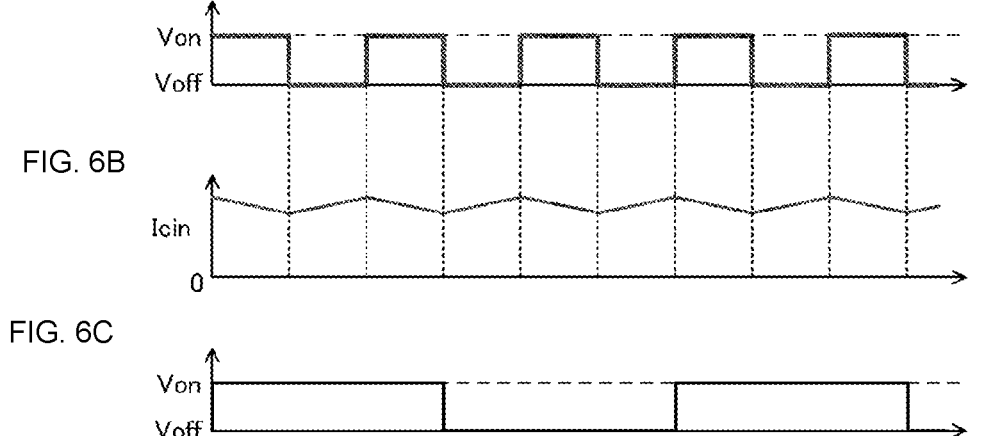
FIGS. 6A to 6D illustrate different waveforms when DC voltage from the secondary battery is converted into AC voltage, and the AC voltage is supplied from the AC output terminal.

FIGS. 6A to 6D illustrate different waveforms when DC voltage from the secondary battery is converted into AC voltage, and the AC voltage is supplied from the AC output terminal. FIGS. 6A and 6C illustrate an example of waveforms of a switching control signal for the switching element Q4. FIGS. 6B and 6D illustrate an example of waveforms with ripple currents superimposed on the converted alternating current. FIGS. 6A and 6B indicate the case in which the switching frequency is relatively high. FIGS. 6C and 6D indicate the case in which the switching frequency is relatively low. The relatively low switching frequency is the same as the switching frequency in charging. It is desirable that the relatively high switching frequency be a frequency of a positive integer multiple of the relatively low switching frequency.

As illustrated in FIGS. 6A and 6B, increasing the switching frequency reduces the amplitude of ripple currents.

As such, ripples superimposed on AC voltage are reduced by driving only the totem-pole bridgeless PFC circuit without driving the first boost chopper circuit and the second boost chopper circuit.

In this configuration, GaN-FETs are used as only the switching elements Q3 and Q4 of the totem-pole bridgeless PFC circuit, whereas Si-MOSFETs are used as the other switching elements Q1, Q2, Q5, and Q6. As a result, the converter 10 can be produced with costs less than if GaN-FETs are used as all the switching elements Q1 to Q6.

The use of GaN-FETs for only the switching elements Q3 and Q4 of the totem-pole bridgeless PFC circuit reduces losses relating to the reverse recovery characteristic and losses caused by parasitic capacitance. The converter 10 is thus implemented with low loss.

In the case in which the voltage at the AC input terminal $P_{AC1}$ is the same as the voltage at the AC output terminal $P_{AC2}$, when the secondary battery 92 is charged, an ON control (a closing control) may be provided to turn on the switch SW1. As a result, while charging the secondary battery 92, the converter 10 supplies AC power to the load coupled to the AC output terminal $P_{AC2}$. At this time, it is more desirable that the converter 10 cause the first boost chopper circuit and the second boost chopper circuit to operate in an interleaving manner.

Example of Practical Use

When the charger 900 is an AC 220V/30A, 6.6 kW output charger, for example, this AC voltage is supplied. The converter 10 provides power conversion in the three phases described above, and the secondary battery 92 is charged with the converted direct current.

By contrast, when the electric power stored in the secondary battery 92 is outputted from the AC output terminal $P_{AC2}$, the converter 10 drives only one phase of the totem-pole bridgeless PFC circuit. As a result, about 2.2 kW output is obtained from the AC output terminal $P_{AC2}$.

In the description of this preferred embodiment, GaN-FETs are used as the switching elements Q3 and Q4 of the totem-pole bridgeless PFC circuit, but the switching elements may be made of another wide-bandgap semiconductor, such as SiC-FETs.

Second Preferred Embodiment

Figure 7:
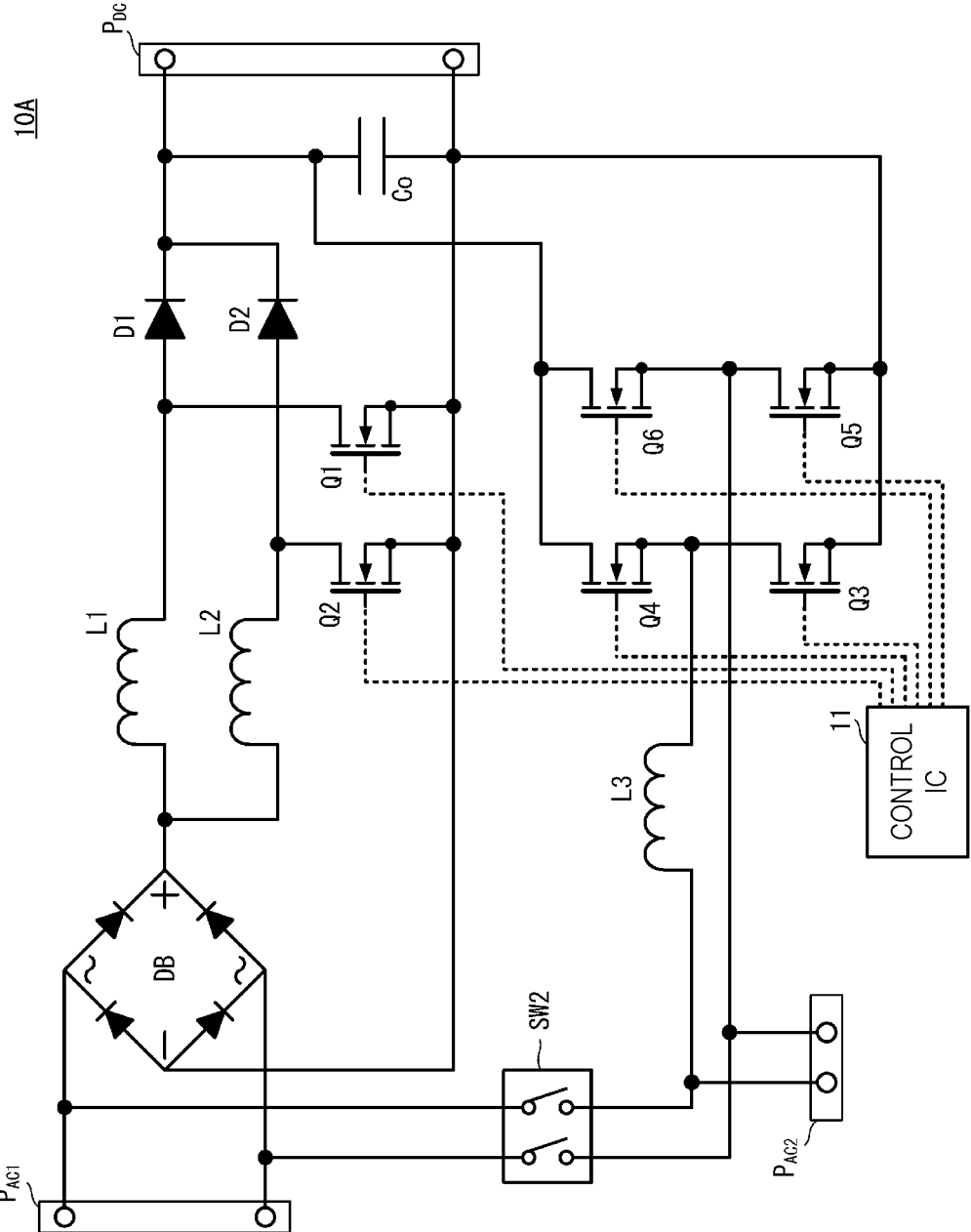
FIG. 7 is an equivalent circuit diagram of a converter (a power conversion device) according to a second preferred embodiment of the present invention.

A power conversion device according to a second preferred embodiment of the present invention will be described with reference to the drawings. FIG. 7 is an equivalent circuit diagram of a converter (a power conversion device) according to the second preferred embodiment of the present invention.

As illustrated in FIG. 7, a converter 10A according to the second preferred embodiment differs from the converter 10 according to the first preferred embodiment in a connection state of a switch SW2 and the AC output terminal $P_{AC2}$.

Other configurations of the converter 10A are the same as the converter 10, and descriptions of the same configurations are not repeated.

In the converter 10A, the AC output terminal $P_{AC2}$ is coupled directly to the second PFC-side connection lines (the connection lines connecting the AC input terminal $P_{AC1}$ and the totem-pole bridgeless PFC circuit).

The switch SW2 is inserted at an intermediate point in the second PFC-side connection lines. More specifically, the switch SW2 is coupled between the AC input terminal $P_{AC1}$ and nodes of the totem-pole bridgeless PFC circuit and the AC output terminal $P_{AC2}$ in the second PFC-side connection lines.

Charging Secondary Battery 92 (First State)

Figure 8:
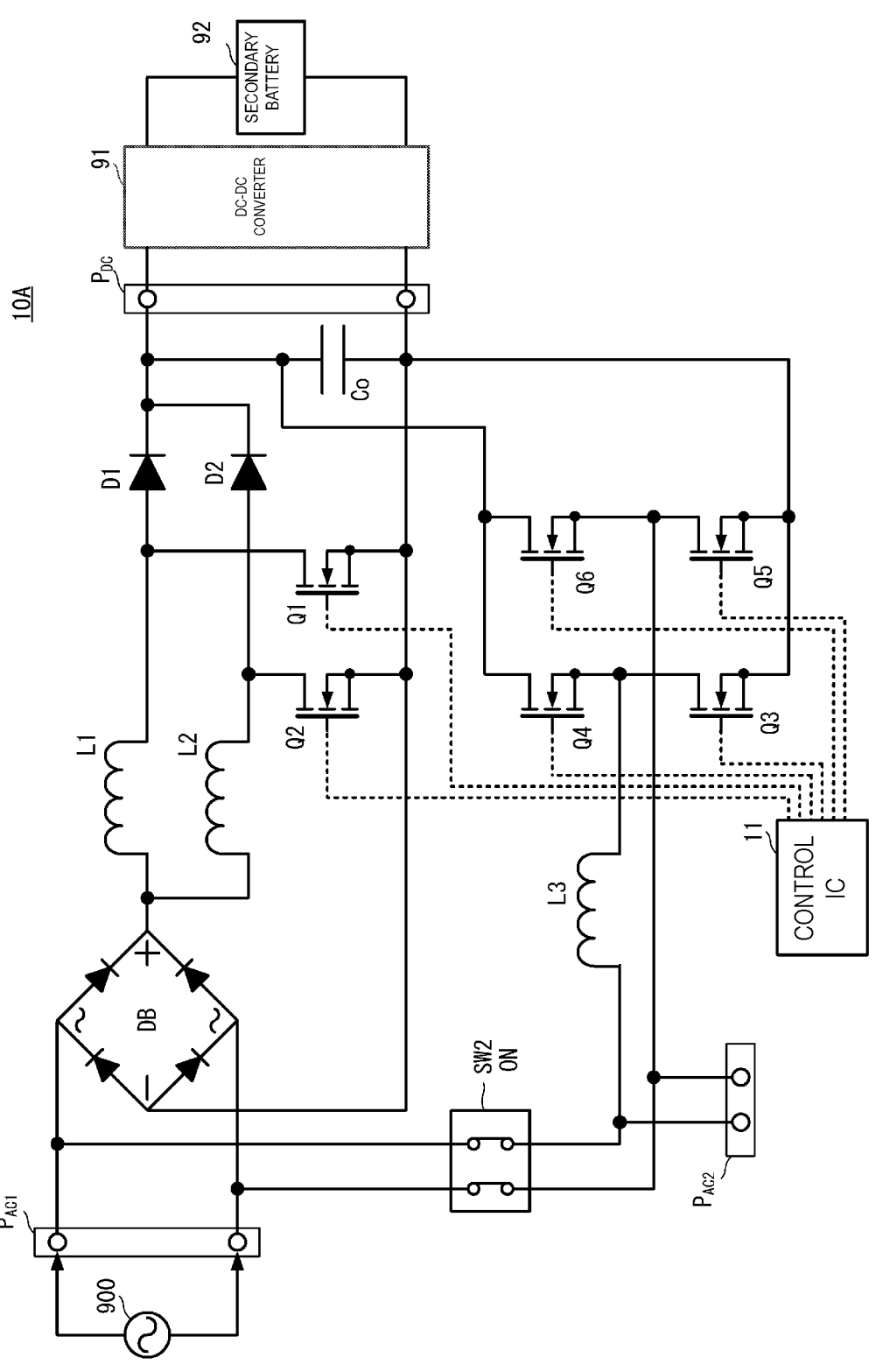
FIG. 8 is an equivalent circuit diagram illustrating a connection state of the converter when a secondary battery is charged.

FIG. 8 is an equivalent circuit diagram illustrating a connection state of the converter when the secondary battery is charged. As illustrated in FIG. 8, the secondary battery 92 is coupled to the DC output terminal $P_{DC}$. Additionally, the charger 900 is coupled to the AC input terminal $P_{AC1}$.

When the secondary battery 92 is charged, an ON control is provided to turn on the switch SW2. In other words, the switch SW2 is closed.

In this state, the control IC 11 outputs switching control signals to the switching elements Q1 to Q6. More specifically, the control IC 11 outputs switching control signals to the switching elements Q1 to Q6 to cause the first boost chopper circuit, the second boost chopper circuit, and the totem-pole bridgeless PFC circuit to operate in an interleaving manner.

With these controls, the converter 10A converts an AC voltage inputted from the AC input terminal $P_{AC1}$ into a DC voltage and outputs the DC voltage from the DC output terminal $P_{DC}$. The secondary battery 92 is charged with this outputted DC voltage. At this time, by performing the controls described above, harmonic currents produced in the converter 10A are reduced.

Supplying AC Power from AC Output Terminal $P_{AC2}$ while Charging Secondary Battery 92

Figure 9:
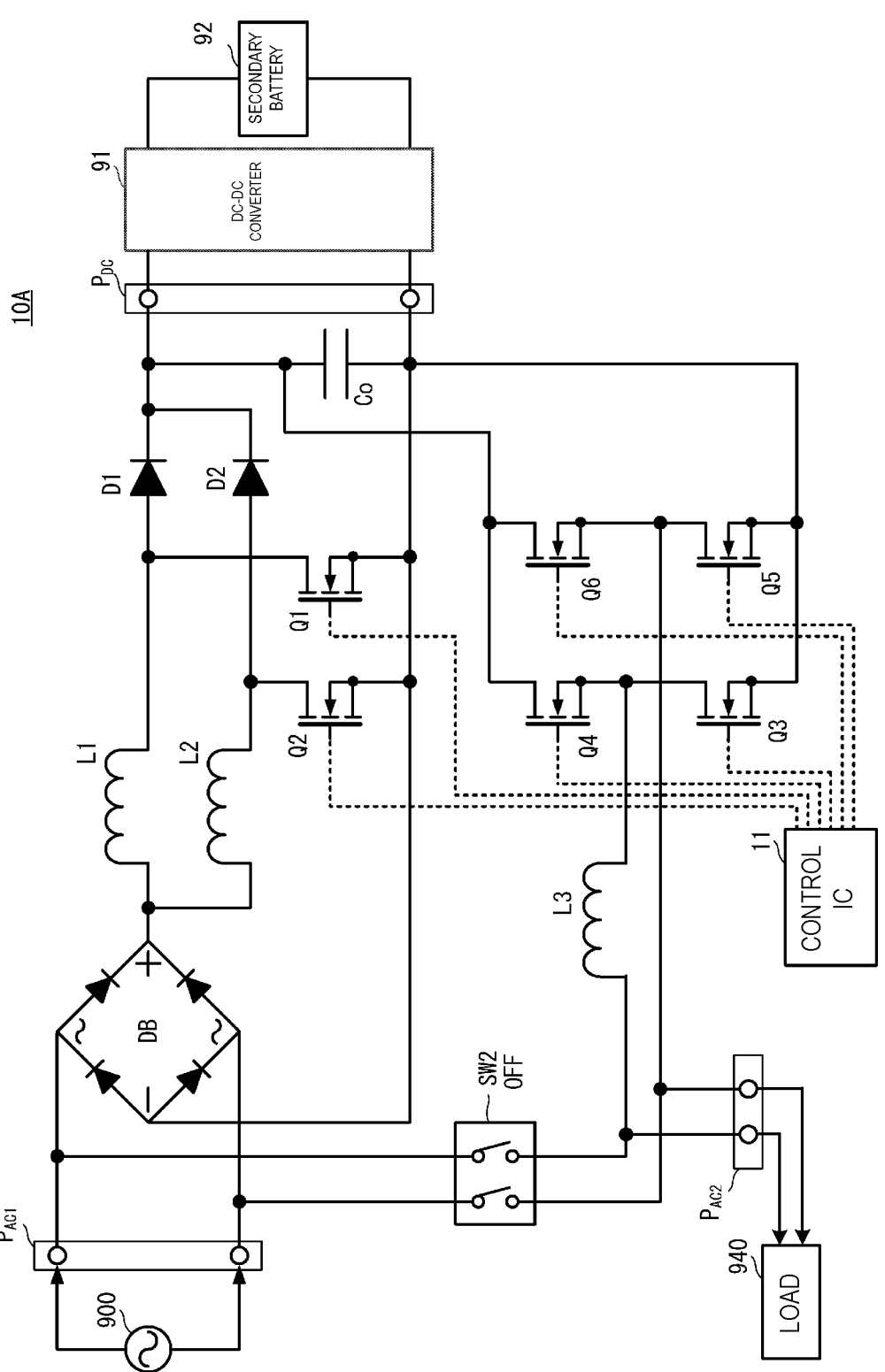
FIG. 9 is an equivalent circuit diagram illustrating a connection state of the converter when AC voltage is supplied while the secondary battery is charged at the same time.

FIG. 9 is an equivalent circuit diagram illustrating a connection state of the converter when AC voltage is supplied while the secondary battery is charged at the same time. As illustrated in FIG. 9, the secondary battery 92 is coupled to the DC output terminal $P_{DC}$. Additionally, the charger 900 is coupled to the AC input terminal $P_{AC1}$. Additionally, the load 940 is coupled to the AC output terminal $P_{AC2}$.

When the secondary battery 92 is charged, and AC power is supplied from the AC output terminal $P_{AC2}$, an OFF control is provided to turn off the switch SW2. In other words, the switch SW2 is opened.

The converter 10A provides switching controls to drive the first boost chopper circuit and the second boost chopper circuit to charge the secondary battery 92 and to cause the totem-pole bridgeless PFC circuit to operate as an inverter to output the electric power in the secondary battery 92 to the AC output terminal $P_{AC2}$. At this time, it is more desirable that the converter 10 cause the first boost chopper circuit and the second boost chopper circuit to operate in an interleaving manner.

As a result, while charging the secondary battery 92, the converter 10A supplies AC power to the load 940 coupled to the AC output terminal $P_{AC2}$.

Supplying DC Power Stored in Secondary Battery 92 to Outside from AC Output Terminal $P_{AC2}$ (Second State)

Figure 10:
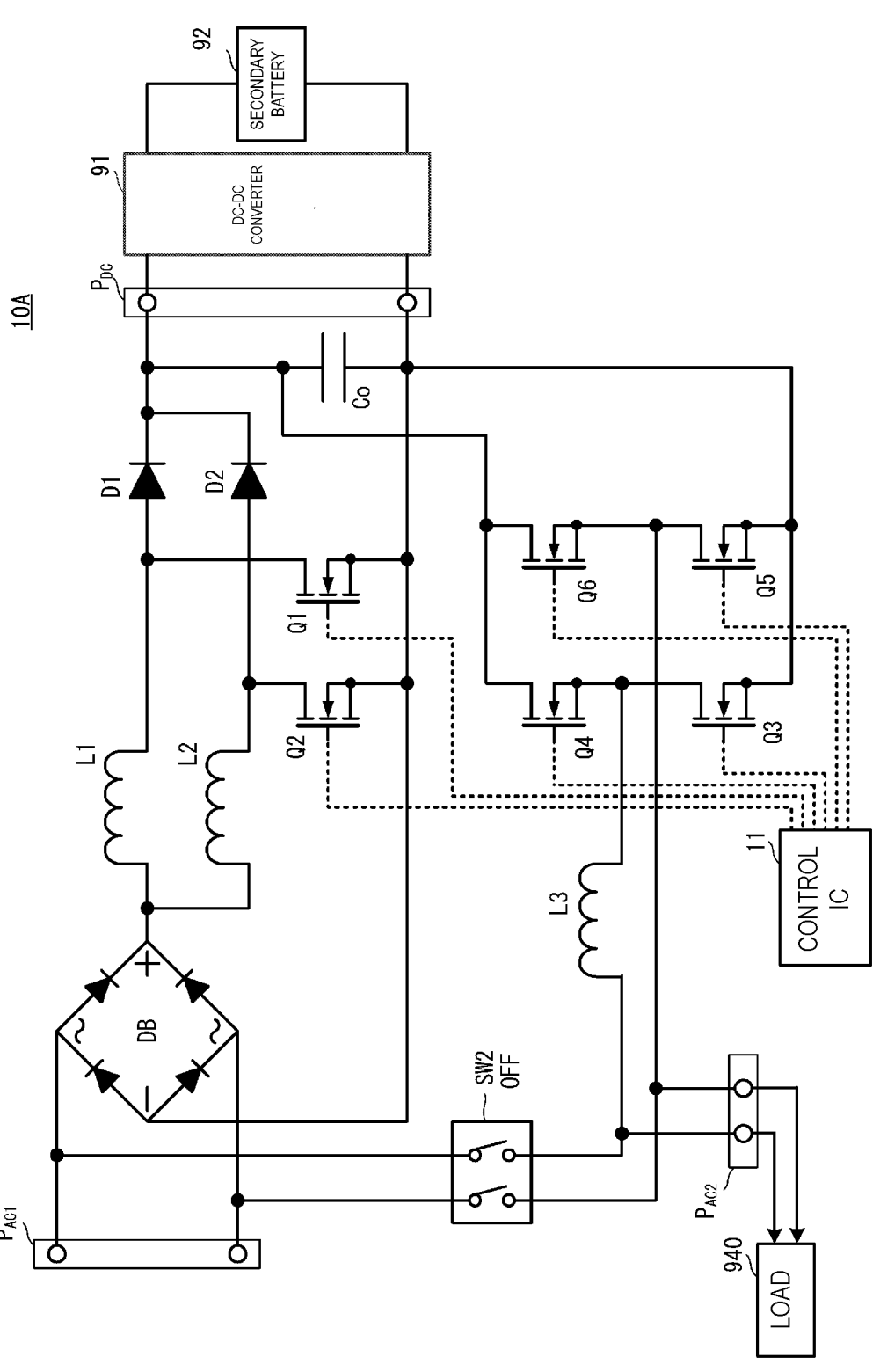
FIG. 10 is an equivalent circuit diagram illustrating a connection state of the converter when the DC power stored in the secondary battery is supplied to the outside from an AC output terminal.

FIG. 10 is an equivalent circuit diagram illustrating a connection state of the converter when the DC power stored in the secondary battery is supplied to the outside from the AC output terminal. As illustrated in FIG. 10, the secondary battery 92 is coupled to the DC output terminal P$_{DC}$. Additionally, the load 940 is coupled to the AC output terminal P$_{AC2}$.

When the DC power stored in the secondary battery 92 is supplied to the outside from the AC output terminal P$_{AC2}$, an OFF control is provided to turn off the switch SW2. In other words, the switch SW2 is opened.

Stop controls are provided to stop the first boost chopper circuit and the second boost chopper circuit. A drive control is provided to drive the totem-pole bridgeless PFC circuit.

With these controls, the converter 10A converts a DC voltage inputted from the DC output terminal P$_{DC}$ into an AC voltage and outputs the AC voltage from the AC output terminal P$_{AC2}$. The outputted AC voltage is supplied to the load 940.

At this time, similarly to the first preferred embodiment, it is desirable that the switching elements of the totem-pole bridgeless PFC circuit be driven at a switching frequency higher than the switching frequency when the secondary battery 92 is charged. As such, ripples superimposed on the load current applied to the load 940 are reduced by driving only the totem-pole bridgeless PFC circuit without driving the first boost chopper circuit and the second boost chopper circuit.

At this time, the converter 10A can also drive the first boost chopper circuit and the second boost chopper circuit. This means that the converter 10A drives the first boost chopper circuit and the second boost chopper circuit to charge the secondary battery 92, while generating AC voltage from the electric power in the secondary battery 92 and outputting the AC voltage from the AC output terminal P$_{AC2}$.

Third Preferred Embodiment

A power conversion device according to a third preferred embodiment of the present invention will be described with reference to the drawings. The converter according to the third preferred embodiment has the same circuit configuration as the converter r according to the first preferred embodiment. The converter according to the third preferred embodiment differs from the converter according to the first preferred embodiment in charging control in light load condition. Other controls in the converter according to the third preferred embodiment are the same as the converter according to the first preferred embodiment, and descriptions of the same controls are not repeated.

Figures 11A, 11B, 11C, 11D, 11E, 11F, 11G:
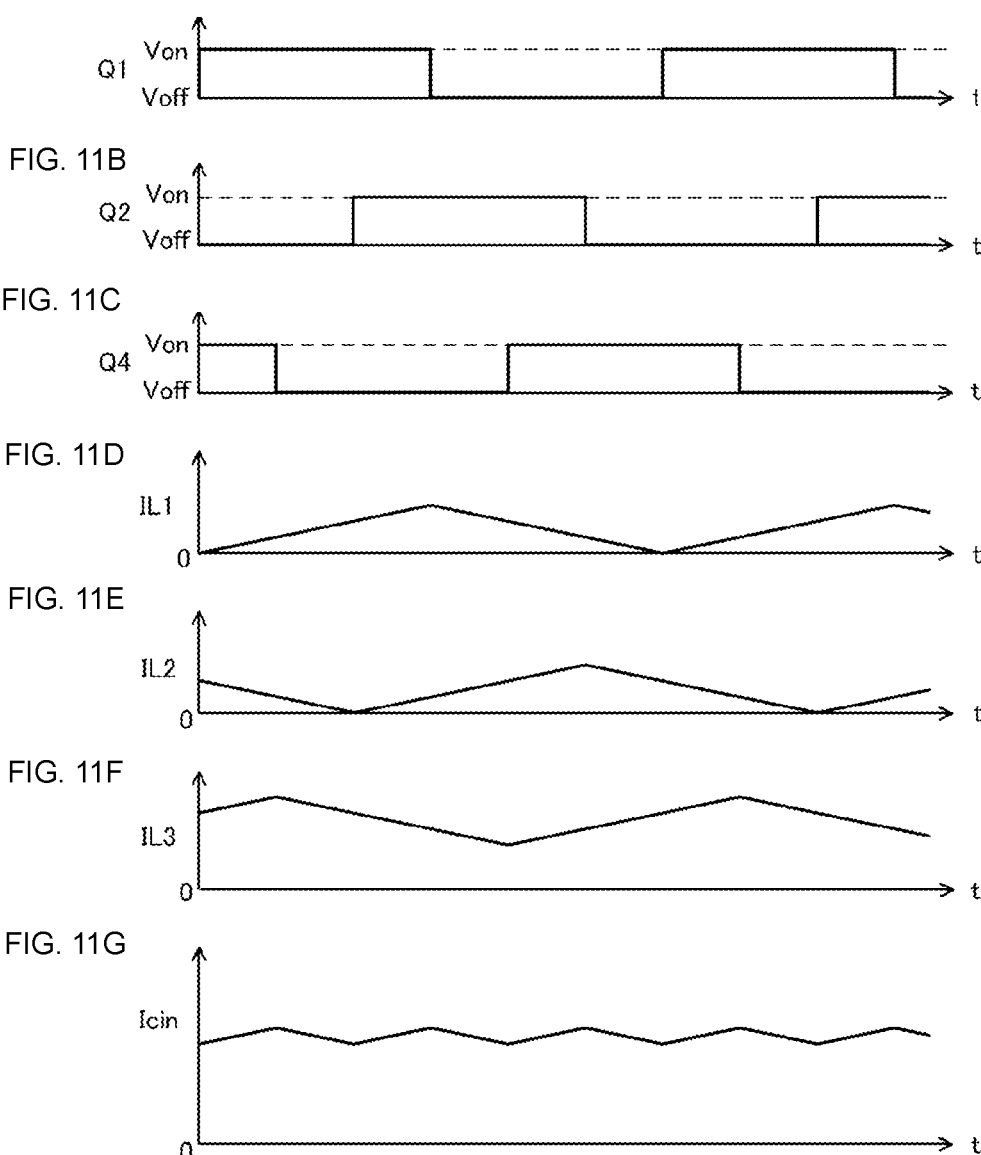
FIGS. 11A to 11G illustrate different waveforms during charging in light load condition.

FIGS. 11A to 11G illustrate different waveforms during charging in continuous conduction mode. FIGS. 12A to 12G illustrate different waveforms during charging when discontinuous conduction mode and continuous conduction mode are used in a combined manner.
Continuous Conduction Mode FIGS. 11A to 11C respectively illustrate an example of waveforms of switching control signals for the switching elements Q1, Q2, and Q4. FIGS. 11D to 11F respectively illustrate an example of a waveform of an inductor current at the inductors L1, L2, and L3. FIG. 11G illustrates an example of a waveform of a current at the AC input terminal P$_{AC1}$. No waveform is illustrated for the switching element Q3, the switching element Q5, and the switching element Q6 in the drawing. The waveform at the switching element Q5 is the same as the waveform at the switching element Q4, whereas the waveform at the switching element Q3 and the waveform at the switching element Q6 are opposite in phase to the waveform at the switching element Q4.

10

Figures 12A, 12B, 12C, 12D, 12E, 12F, 12G:
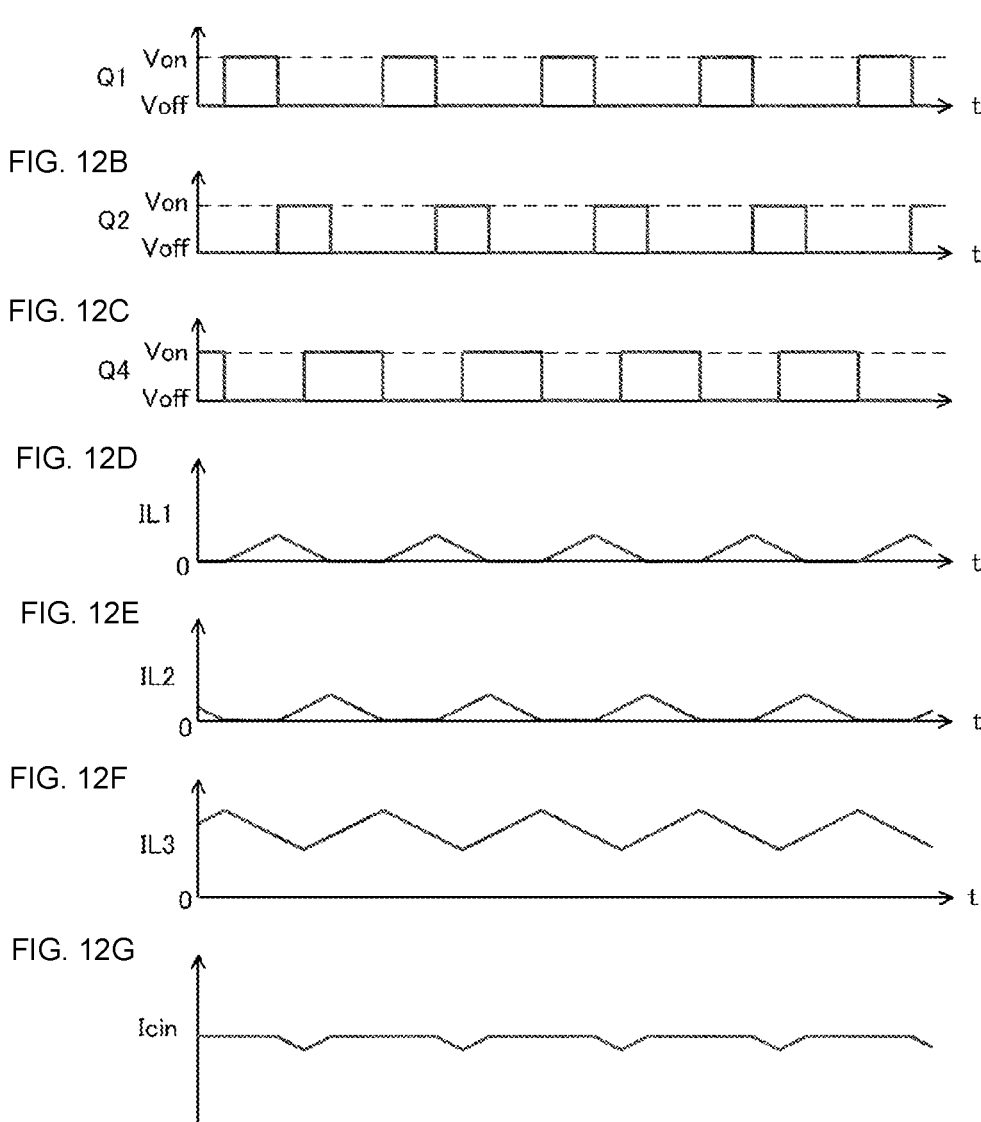
FIGS. 12A to 12G illustrate different waveforms during charging when discontinuous conduction mode and continuous conduction mode are used in a combined manner.

As illustrated in FIGS. 11A to 11E, in light load condition, the converter causes the first boost chopper circuit and the second boost chopper circuit to operate in boundary conduction mode. As illustrated in FIGS. 11C and 11F, in light load condition, the converter causes the totem-pole bridgeless PFC circuit to operate in continuous conduction mode.
Combined Use of Discontinuous Conduction Mode and Continuous Conduction Mode FIGS. 12A to 12C respectively illustrate an example of waveforms of switching control signals for the switching elements Q1, Q2, and Q4. FIGS. 12D to 12F respectively illustrate an example of a waveform of an inductor current at the inductors L1, L2, and L3. FIG. 12G illustrates an example of a waveform of a current at the AC input terminal P$_{AC1}$. No waveform is illustrated for the switching element Q3, the switching element Q5, and the switching element Q6 in the drawing; the waveform at the switching element Q5 is the same as the waveform at the switching element Q4, whereas the waveform at the switching element Q3 and the waveform at the switching element Q6 are opposite in phase to the waveform at the switching element Q4.

As: illustrated in FIGS. 12A to 12E, in light load condition, the converter causes the first boost chopper circuit and the second boost chopper circuit to operate in discontinuous conduction mode. As illustrated in FIGS. 12C and 12F, in light load condition, the converter causes the totem-pole bridgeless PFC circuit to operate in continuous conduction mode.

Under these controls, in light load condition, only ripple currents as the inductor currents IL1 and IL2 flow in the first boost chopper circuit and the second boost chopper circuit. A current obtained by adding the direct-current component and the ripple component superimposed on the direct-current component as the inductor current IL3 flows in the totem-pole bridgeless PFC circuit.

By providing these controls, in light load condition, the converter uses the totem-pole bridgeless PFC circuit, which achieves high efficiency, more than the other circuits to perform charging. This enhances the power conversion efficiency in light load condition. As illustrated in FIGS. 11A and 11B, under these controls, the switching elements of the first boost chopper circuit and the second boost chopper circuit are turned on when the current is zero. This reduces switching losses in the first boost chopper circuit and the second boost chopper circuit, and as a result, the power conversion efficiency of the converter is further enhanced.

Furthermore, similarly to the first preferred embodiment, under these controls, the first boost chopper circuit, the second boost chopper circuit, and the totem-pole bridgeless PFC circuit operate in an interleaving manner, and thus, ripple currents are reduced.

In light load condition, the first boost chopper circuit and the second boost chopper circuit may be stopped. In this case, it is desirable that the switching frequency of the totem-pole bridgeless PFC circuit be relatively high. For example, it is desirable that the switching frequency of the totem-pole bridgeless PFC circuit be three times as high as when the totem-pole bridgeless PFC circuit operates with the first boost chopper circuit and the second boost chopper circuit in an interleaving manner. As such, ripple currents are reduced when the totem-pole bridgeless PFC circuit solely operates.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power conversion device comprising:
a converter including:
an alternating-current (AC) voltage input terminal;
a first power factor correction (PFC) converter and a second PFC converter that are coupled to the AC voltage input terminal, the first PFC converter and the second PFC converter being coupled in parallel to each other; and
a direct-current (DC) voltage output terminal to supply a combined output obtained by combining an output from the first PFC converter and an output from the second PFC converter;
the first PFC converter includes a PFC converter with a diode rectifier;
the second PFC converter includes a totem-pole bridgeless PFC converter;
the power conversion device further comprises:
a switch coupled to a second PFC-side connection line connecting the AC voltage input terminal and the second PFC converter; and
an AC voltage output terminal coupled to the second PFC-side connection line; and
the converter is operable to, based on an operating control of the first PFC converter and the second PFC converter and an on-off control of the switch, selectively operate in any one state including:
a first state in which an AC voltage from the AC voltage input terminal is converted into a DC voltage, and the DC voltage is outputted from the DC voltage output terminal;
a second state in which a DC voltage from the DC voltage output terminal is converted into an AC voltage, and the AC voltage is outputted from the AC voltage output terminal; and
a direct coupling output state in which an AC voltage from the AC voltage input terminal is outputted from the AC voltage output terminal;
in a combined state of the first state and the second state; or
in a combined state of the first state and the direct coupling output state.

2. The power conversion device according to claim 1, wherein the switch is coupled between the second PFC-side connection line and the AC voltage output terminal.

3. The power conversion device according to claim 1, wherein the switch is coupled between the AC voltage input terminal and a node of the second PFC converter and the AC voltage output terminal in the second PFC-side connection line.

4. The power conversion device according to claim 1, wherein the first PFC converter and the second PFC converter are operable in an interleaving manner.

5. The power conversion device according to claim 1, wherein a switch including a gallium nitride semiconductor is included in the second PFC converter.

6. The power conversion device according to claim 5, wherein a switching frequency of the switch including the gallium nitride semiconductor in the second state is higher than in the first state.

7. The power conversion device according to claim 1, wherein, when a DC load coupled to the DC voltage output terminal is in light load condition:
the first PFC converter is driven to operate in boundary conduction mode or discontinuous conduction mode; and
the second PFC converter is driven to operate in continuous conduction mode.

8. The power conversion device according to claim 1, wherein, when a DC load coupled to the DC voltage output terminal is in light load condition:
the first PFC converter is stopped, and the second PFC converter is driven; and
a switching frequency of a switch of the second PFC converter is increased.

9. The power conversion device according to claim 1, wherein the power conversion device is a bidirectional power factor correction circuit.

10. The power conversion device according to claim 1, further comprising a diode bridge, a plurality of inductors, a plurality of switches, a plurality of diodes, a capacitor, and a control integrated circuit.

11. The power conversion device according to claim 10, wherein the plurality of switches are MOSFETs or GaN-FETS.

12. The power conversion device according to claim 1, wherein the first PFC converter includes a first boost chopper circuit and a second boost chopper circuit.

13. The power conversion device according to claim 1, wherein the second PFC converter includes a totem-bridgeless PFC circuit.

14. The power conversion device according to claim 1, further comprising:
a diode bridge; wherein
the first PFC converter includes a first boost chopper circuit and a second boost chopper circuit;
the second PFC converter includes a totem-bridgeless PFC circuit;
the diode bridge and the first and second boost chopper circuits implement two phases, and the totem-pole bridgeless PFC circuit implements one phase.

15. A vehicle comprising the power conversion device according to claim 1.

16. The vehicle according to claim 15, further comprising a direct current to direct current converter, a secondary battery, an alternating-current charging socket, and an AC outlet.

17. The vehicle according to claim 16, wherein the alternating-current charging socket is coupled to the power conversion device.

18. The vehicle according to claim 16, wherein an external charging cable is plugged into the alternating-current charging socket to charge the secondary battery.

19. The vehicle according to claim 16, wherein the power conversion device is operable to convert an AC voltage from the alternating-current charging socket into a DC voltage and output the DC voltage to the direct current to direct current converter.

20. The vehicle according to claim 16, wherein the vehicle is an electric vehicle or a hybrid vehicle.

* * * * *